United States Patent [19]

Ming et al.

[11] Patent Number: 5,433,766
[45] Date of Patent: Jul. 18, 1995

[54] SLOW-RELEASE FERTILIZER

[75] Inventors: Douglas W. Ming; Dadigamuwage C. Golden, both of Houston, Tex.

[73] Assignee: The United States of America as represented by the Administrator of the National Aeronautics and Space Administration, Washington, D.C.

[21] Appl. No.: 243,335

[22] Filed: May 2, 1994

Related U.S. Application Data

[63] Continuation of Ser. No. 963,348, Oct. 16, 1992, abandoned.

[51] Int. Cl.⁶ .................... C01B 15/16; C01B 25/26; C05B 3/00
[52] U.S. Cl. ............................ 71/36; 71/51; 71/53; 71/64.11; 423/308; 423/312
[58] Field of Search ............... 71/53; 471/33, 34, 36, 471/50, 51, 64.11; 423/307, 308, 309, 312

[56] References Cited

U.S. PATENT DOCUMENTS

| | | | |
|---|---|---|---|
| 2,211,918 | 8/1940 | Torrentine ...................... | 71/53 |
| 3,958,973 | 5/1976 | Roberts . | |
| 4,139,599 | 2/1979 | Tomlinson et al. .................. | 423/308 |
| 4,175,943 | 11/1979 | Jordaan et al. ............................ | 71/29 |
| 4,299,613 | 11/1981 | Cardarelli ................................ | 71/64 |
| 4,321,078 | 3/1982 | Michaud ...................... | 71/53 |
| 4,334,906 | 6/1982 | Young ...................... | 71/33 |
| 4,337,078 | 6/1982 | Petrov et al. ............................ | 71/24 |
| 4,363,650 | 12/1982 | Glasser et al. ............................ | 71/36 |
| 4,402,725 | 9/1983 | Heller et al. ............................ | 71/27 |

(List continued on next page.)

OTHER PUBLICATIONS

CA(105)12: 99955M, Inoue et al, Calcium-Phosphorous Tepe Apatite Jul. 1986.
Caro et al., *Journal of Agriculture Food Chemistry*, 4:684–687, 1956. No month.
McClellan et al., *American Mineralogist*, 54:1374–1391. No month.
Ming et al., "Fertilization by Mineral dissolution and Ion-Exchange," *Agronomy Abstracts*, Soil Science Division, Oct. 27–Nov. 1, 1991.
Resseler et al., *Fertilizer Research*, 20:135–143. No month/no year.
Ming, *Lunar Base Agriculture: Soils for Plant Growth*, Madison Wis.:ASA-CSSA-SSSA, pp. 93–105, 1989. No month.
MacKown et al., *Soil Science Society American Journal*, 49:235–238, 1985. No month.
Pirella et al., *Zeo-Agriculture: Use of Natural Zeolites in Agriculture and Aquaculture*, Pond et al., (ed.) Boulder Colo.: Westview Press, 1983. No month.
Ferguson et al., *Soil Science Society American Journal*, 51:231–234, 1987. No month.
Allen et al., *Agronomy Abstracts*, Soil Science Division S-2-Soil Chemistry, Nov. 27–Dec. 2, 1988.
Parham, *Zeo-Agriculture: Use of Natural Zeolites in Agriculture and Aquaculture*, Pond et al., (ed.) Boulder Colo.: Westview Press, 1983. No month.
Lewis et al., *Zeo-Agriculture: Use of Natural Zeolites in Agriculture and Aquaculture*, Pond et al., (ed.) Boulder Colo.: Westview Press, 1983. No month.
Iskenderov et al., *Occurance, Properties and Utilization of*

(List continued on next page.)

*Primary Examiner*—Ferris Lander
*Attorney, Agent, or Firm*—Hardie R. Barr; Guy M. Miller; Edward K. Fein

[57] ABSTRACT

A synthetic apatite containing agronutrients and a method for making the apatite are disclosed. The apatite comprises crystalline calcium phosphate having agronutrients dispersed in the crystalline structure. The agronutrients can comprise potassium, magnesium, sulfur, iron, manganese, molybdenum, chlorine, boron, copper and zinc in amounts suited for plant growth. The apatite can optionally comprise a carbonate and/or silicon solubility control agent. The agronutrients are released slowly as the apatite dissolves.

37 Claims, 1 Drawing Sheet

U.S. PATENT DOCUMENTS

| | | | |
|---|---|---|---|
| 4,507,139 | 3/1985 | Sullivan et al. | 71/50 |
| 4,557,749 | 12/1985 | Berthet et al. | 71/64 |
| 4,670,039 | 6/1987 | Sjogren | 71/34 |
| 4,711,769 | 12/1987 | Inoue et al. | 423/308 |
| 4,836,994 | 6/1994 | Inoue et al. | 423/308 |
| 4,994,100 | 2/1991 | Sutton et al. | 71/30 |
| 4,995,897 | 2/1991 | Schramm et al. | 71/64 |
| 5,037,470 | 8/1991 | Matzen | 71/53 |
| 5,106,405 | 4/1992 | Goto | 71/7 |

OTHER PUBLICATIONS

*Natural Zeolites,* Kallo' et al., (ed.), Budapest: Akademiai Kiado, pp. 717–720, 1988. No month.

Ferguson et al., *Agronomy Journal,* 78:1095–1098, 1986. No month.

Lai et al., *Zeolites* 6:129–132, 1986. No month.

Hersey et al., *Horticulture Science,* 15:87–89, 1980. No month.

Weber, *Journal of Environmental Quality* 12:549–552, 1983. No month.

Guerry H. McClellan and James R. Lehr, Crystal Chemical Investigation of Natural Apatites, *The American Mineralogist,* vol. 54, Sep.–Oct., 1969, pp. 1374–1391.

Barbarick et al., "Response of Sorghum–Sudangrass in Soils Amended with Phosphate Rock and $NH_4$-Exhanged Zeolite," Technical Bulletin, Colorado State Univ., TB88-1, 1988 Jun. 1988.

Casey et al., "Leaching of Mineral and Glass Surfaces During Dissolution," *Reviews in Mineralogy,* Hochella, Jr. et al editors, vol. 23, pp. 397–426 (1990) (no month).

Chesworth et al., "Solubility of Apatite in Clay and Zeolite Bearing Systems: Application to Agriculture," Applied Clay Sciences, vol. 2, pp. 291–297 (1987) (no month).

Golden, "Synthetic Micronutrient—Substituted Apatites as Direct Application Fertilizers," Agronomy Abstracts, 1991 Annual Meeting, Oct. 27–Nov. 1, p. 365 (1991).

Ming et al., *Space 92: The Third International Coference on Engineering, Construction and Operations in Space,* Sadeh et al., editors, pp. 1709–1719 (1992) (no month).

Resseler et al., "Preparation and use of $^{33}P$ Labelled Carbonate Fluoroapatite in Studies on the Effect of Phosphate Rock Containing Fertilizers," *Z. Pflanzernernahr. Bodenk.,* 152:325–332 (1989) (no month).

Smith et al., "An X-Ray Investigation of Carbonate Apatites," *Journal of Agricultural Food Chemicals,* pp. 342–349 (1966) (no month).

Van Vlack, *Elements of Materials Science,* Second Edition, pp. 74–79 (1966) (no month).

EXAMPLE 3    EXAMPLE 1    EXAMPLE 2

SLOW-RELEASE FERTILIZER

ORIGIN OF THE INVENTION

The invention described herein was made by employee(s) of the United States Government and may be manufactured and used by or for the Government of the United States of America for governmental purposes without the payment of any royalties thereon or therefor.

This application is a continuation of application Ser. No. 07/963,348, filed Oct. 16, 1992 and now abandoned.

FIELD OF THE INVENTION

The present invention relates to a slow-release fertilizer composition having agronomic nutrient elements dispersed in a synthetic apatite.

BACKGROUND OF THE INVENTION

Agronomists and botanists have recognized the vital function of sixteen nutrients needed by growing plants including the trace elements or micronutrients—zinc, chlorine, iron, manganese, copper, molybdynum and boron. It is also known that the optimal spectrum and concentration of micronutrients in a particular soil can vary depending on the plants being grown, soil properties, climate, and the stage of the plant growth cycle.

While most soils contain micronutrients at least to some extent and the overall need is small, depletion can occur with intensive agricultural activity. Even when the soil concentration is putatively adequate, other factors can prevent micronutrient uptake by the plant. Since micronutrients must be available as soluble ions, such ions can be immobilized in low solubility alkaline soils and/or can be tapped in clays or other organic materials as insoluble complexes.

It has been common practice to supplement phosphorus-impoverished soil by using a mineral fertilizer such as rock phosphate or apatite. Such minerals, however, do not supply the required micronutrients and can contain toxic elements such as fluorine and cadmium. Other minerals can be used to supply micronutrients, however, micronutrient content can not usually be adjusted.

Required micronutrients can also be supplied directly in bulk. One disadvantage of multiple mineral and/or inorganic phases is the varying rates at which the materials dissolve and diffuse in the soil. Also, such additions give little control over micronutrient soil concentration with respect to plant needs from day to day. Another disadvantage is the relatively large quantities needed to overcome solubility and soil impediments. Bulk fertilizer can be carried off by rain or irrigation water or leached from the soil as a ground water pollutant. Thus, bulk use is inefficient and costly.

In space travel, agronomical species such as wheat, potatoes, soybeans, and the like in hydroponic tanks can fixate carbon dioxide into edible biomass. Hydroponic systems, however, require soluble nutrients to be continuously supplied and closely monitored. Hence, solid-support substrates may provide a low maintenance, high reliability substrate for plant growth. It is, therefore, very desirable that the fertilizer is strictly tailored to the requirements of the on-board cultures. In addition, the fertilizer should be compact, long-lasting and contain all required micronutrients, which are released as needed over a long period time, encompassing several growing seasons, without replenishment.

It is consequently desirable to tailor a synthetic phosphate fertilizer composition to specific agronomic needs in both terrestrial and space environments. It is also desirable that the composition have only the desired spectrum of micronutrient elements which can be released in a controlled manner and be free of toxic elements which are normally present in natural phosphate fertilizers.

U.S. Pat. No. 3,958,973 to Roberts describes a micronutrient metal containing phosphate glass for fertilizer use. The glass is based on $P_2O_5$ and the micronutrients are based on the metal oxide. A solubility control agent is said to be present to control the amount and rate of release.

U.S. Pat. No. 4,299,613 to Carderelli describes a polymeric composition incorporating essential plant growth compounds in ionic form. These compounds are said to be gradually, continuously and uniformly released over a long period of time in response to the presence of moisture.

U.S. Pat. No. 4,334,906 to Young describes a combination soil amendment and micronutrient source. The composition comprises highly porous sulfur particles having substantial internal surface area with the micronutrient source dispersed either throughout the particle matrix or over the interior surfaces.

U.S. Pat. No. 4,670,039 to Sjogren describes a controlled slow release fertilizer composition comprising an encapsulated fertilizer, carbon particles and plaster.

U.S. Pat. No. 4,994,100 to Sutton et al. describes a granular nitrogen fertilizer made up of urea, dicyandiamide, ammonium thiosulfate, and optionally a phosphate compound. This composition can contain various micronutrients.

U.S. Patent 4,557,749 to Berthet et al. describes a sealed container for a hydrosoluble fertilizer or agricultural product. The container has a wall made of a hydrophobic polymer diaphragm with hydrophilic inclusions which absorb water. Water passing into the container dissolves the fertilizer which is then desorbed into the medium being treated.

Other U.S. Patents of interest include U.S. Pat. Nos. 4,507,139 to Sullivan et al.; 4,175,943 to Jordaan et al.; and 4,995,897 to Schramm et al.

SUMMARY OF THE INVENTION

The present invention is a synthetic apatite phosphate fertilizer composition containing essential micronutrients as well as other essential nutrients such as magnesium, potassium and sulfur, and a method for making the composition. In addition, the synthetic apatite is essentially free of toxic elements. Furthermore, a solubility control agent can be added to enhance control of the nutrient release rate.

In one embodiment, the present invention provides for a synthetic apatite useful as a slow-release fertilizer. The apatite has a matrix of calcium phosphate and one or more agronutrients dispersed in the matrix. The apatite is preferably essentially free of agrotoxins, such as, for example, fluorine, cadmium and sodium, in amounts detrimental to the growth of most plants. Agronutrients include, for example, potassium, magnesium, sulfur, zinc, chlorine, iron, manganese, copper, molybdenum and/or boron. The synthetic apatite can further include a carbonate and/or silicon solubility control agent. The matrix preferably comprises a synthetic apatite.

In another embodiment, the synthetic apatite is prepared by combining in an aqueous medium, a water soluble ionic calcium compound, a water soluble ionic phosphate compound and one or more water soluble compounds of agronutrients selected from potassium, magnesium, sulfur, zinc, chlorine, iron, manganese, copper, molybdenum, boron and combinations thereof. The synthetic apatite can also include one or more silicon or carbonate compounds as a solubility control agent. A calcium phosphate is precipitated which has agronutrients dispersed in a matrix. In other steps the precipitate is recovered and dried.

In a preferred embodiment, the present invention provides an agronutrient-substituted hydroxylapatite of generally uniform composition having the formula:

$$(Ca_{5-xm/2}M_x)((PO_4)_{3-yq/3}Q_y)((OH)_{1-z}X_z)$$

wherein M is a cation containing an element selected from potassium, zinc, iron, manganese, magnesium, or copper, or a combination thereof; wherein m is the molar average valence of M according to the equation $m=(\Sigma m_i x_i)/(\Sigma x_i)$ where each $m_i$ is the valence of an ith cation and $x_i$ is the relative molar proportion of the ith cation; wherein Q is an anion of carbonate, silicate or containing an element selected from boron, molybdenum, or sulfur, or a combination thereof; wherein q is the molar average valence of Q according to the equation $q=(\Sigma q_i y_i)/(\Sigma y_i)$ where each $q_i$ is the valence of an ith anion and $y_i$ is the relative molar proportion of the ith anion; wherein X is chloride, fluoride or a combination thereof; and wherein x has a value of 0–0.82, y has a value of 0–0.76, and z has a value of 0–0.15, provided that at least one of x and y are greater than zero, and when x is zero Q includes an anion of boron, molybdenum, or sulfur, and also provided that the amount of fluoride does not exceed 3000 ppm by weight. Preferably $M_x$ has the formula:

$$K_{x_K}Mg_{x_{Mg}}Fe_{x_{Fe}}Zn_{x_{Zn}}Mn_{x_{Mn}}Cu_{x_{Cu}}$$

wherein $x_K \leq 0.205$; $x_{Mg} \leq 0.412$; $x_{Fe} \leq 0.144$; $x_{Zn} \leq 0.0123$; $x_{Mn} \leq 0.044$; $x_{Cu} \leq 0.0038$; $x=x_K+x_{Mg}+x_{Fe}+x_{Zn}+x_{Mn}+x_{Cu}$; and wherein $x>0$. More preferably, $0.051 \leq x_K \leq 0.205$; $0.165 \leq x_{Mg} \leq 0.412$; $0.0359 \leq x_{Fe} \leq 0.144$; $0.006 \leq x_{Zn} \leq 0.0123$; $0.018 \leq x_{Mn} \leq 0.044$; and $0.0016 \leq x_{Cu} \leq 0.0038$. Especially, $0.102 \leq x_K \leq 0.154$; $0.247 \leq x_{Mg} \leq 0.33$; $0.072 \leq x_{Fe} \leq 0.108$; $0.0061 \leq x_{Zn} \leq 0.0092$; $0.018 \leq x_{Mn} \leq 0.036$; and $0.0025 \leq x_{Cu} \leq 0.0032$. $Q_y$ preferably has the formula:

$$(CO_3)_{y_C}(SiO_4)_{y_{Si}}(MoO_4)_{y_{Mo}}(BO_3)_{y_B}(SO_4)_{y_S}$$

wherein $y_C$ has a value up to about 0.5, $y_{Si}$ has a value up to about 0.218, $y_{Mo}$ has a value up to about 0.000052, $y_B$ has a value up to about 0.0093, and $y_S$ has a value up to about 0.25; and wherein $y=y_C+y_{Si}+y_{Mo}+y_B+y_S$, and $(y_{Mo}+y_B+y_S)>0$. More preferably, $0.00002 \leq y_{Mo} \leq 0.000042$; $0.00185 \leq y_B \leq 0.00741$; and $0.125 \leq y_S \leq 0.25$. Especially, $0.000021 \leq y_{Mo} \leq 0.0000313$; $0.0037 \leq y_B \leq 0.0056$; and $0.156 \leq y_S \leq 0.219$. Where carbonate is used as the solubility control agent, preferably $0.0668 \leq y_C \leq 0.334$, and especially $0.134 \leq y_C \leq 0.2$; where silicate is used, preferably $0.0435 \leq y_{Si} \leq 0.131$, and especially $0.0653 \leq y_{Si} \leq 0.109$. $X_z$ preferably has the formula:

$$Cl_{z_{Cl}}F_{z_F}$$

wherein $z_{Cl}$ has a value up to about 0.071, $z_F$ has a value less than about 0.08, and $z=z_{Cl}+z_F$. More preferably, $0.0283 \leq z_{Cl} \leq 0.071$; and $z_F \leq 0.008$. Especially, $0.0565 \leq z_{Cl} \leq 0.064$; and $z_F \leq 0.00008$.

In a particularly preferred embodiment, the present invention provides an agronutrient-substituted hydroxylapatite of the formula:

$$[Ca_{5-xm/2}K_{x_K}Mg_{x_{Mg}}Fe_{x_{Fe}}Zn_{x_{Zn}}Mn_{x_{Mn}}Cu_{x_{Cu}}][(PO_4)_{3-yq/3}(CO_3)_{y_C}(SiO_4)_{y_{Si}}(MoO_4)_{y_{Mo}}(BO_3)_{y_B}(SO_4)_{y_S}][(OH)_{1-z}Cl_{z_{Cl}}F_{z_F}]$$

wherein m is the molar average valence of the potassium, magnesium, iron, zinc, manganese and copper cations according to the equation:

$$m=(x_K+2x_{Mg}+2x_{Fe}+2x_{Zn}+2x_{Mn}+2x_{Cu})/x$$

wherein q is the molar average valence of the anions $CO_3$, $SiO_4$, $MoO_4$, $BO_3$ and $SO_4$ according to the equation:

$$q=(2y_C+4y_{Si}+2y_{Mo}+3y_B+2y_S)/y$$

wherein $m_S$ is the valence of $Q_S$; wherein $x=x_K+x_{Mg}+x_{Fe}+x_{Zn}+x_{Mn}+x_{Cu}$, $y=y_C+y_{Si}+y_{Mo}+y_B+y_S$, $z=z_{Cl}+z_F$, at least one of x, $y_{Mo}$, $y_B$ and $y_S$ is greater than zero; and wherein $x_K \leq 0.21$; $x_{Mg} \leq 0.41$; $x_{Fe} \leq 0.14$; $x_{Zn} \leq 0.012$; $x_{Mn} \leq 0.044$; $x_{Cu} \leq 0.0038$; $y_C \leq 0.5$; $y_{Si} \leq 0.218$; $y_{Mo} \leq 0.000052$; $y_B \leq 0.0093$; $y_S \leq 0.25$; $z_{Cl} \leq 0.071$; and $z_F \leq 0.08$. Preferably, $0.051 \leq x_K \leq 0.205$; $0.165 \leq x_{Mg} \leq 0.412$; $0.0359 \leq x_{Fe} \leq 0.144$; $0.006 \leq x_{Zn} \leq 0.0123$; $0.018x_{Mn} \leq 0.044$; $0.0016 \leq x_{Cu} \leq 0.0038$; $0.00002 \leq y_{Mo} \leq 0.000042$; $0.00185 \leq y_B \leq 0.00741$; $0.125 \leq y_S \leq 0.25$; $0.0283 \leq z_{Cl} \leq 0.071$; and $z_F \leq 0.008$. Especially, $0.102 \leq x_K \leq 0.154$; $0.247 \leq x_{Mg} \leq 0.33$; $0.072 \leq x_{Fe} \leq 0.108$; $0.002 \leq x_{Zn} \leq 0.009$; $0.018 \leq x_{Mn} \leq 0.036$; $0.0025 \leq x_{Cu} \leq 0.0032$; $0.000021 \leq y_{Mo} \leq 0.0000313$; $0.0037 \leq y_B \leq 0.0056$; $0.157 \leq y_S \leq 0.219$; $0.0565 \leq z_{Cl} \leq 0.064$; and $z_F \leq 0.00008$.

In yet another embodiment, the present invention provides a fertilizing method. In one step, the synthetic apatite composition described above is placed adjacent a root structure of a plant. In another step, the synthetic apatite is contacted with moisture to dissolve the agronutrients.

In a further embodiment, the present invention provides a hydroponics fertilizing method wherein a hydroponics solution is circulated through a bed of the present synthetic apatite as described above to replenish the concentration of agronutrient species in the hydroponics solution. As another step, a root structure of a plant is contacted with the hydroponics solution.

DETAILED DESCRIPTION OF THE INVENTION

Essential agronomic nutrients for plant growth including potassium, magnesium, sulfur and micronutrients are incorporated into a matrix of a synthetic apatite. Upon contact by moisture, the nutrients are slowly released, as required, for plant use. In addition, a solubility control agent can be added to enhance control over the fertilization rate.

The major component of the synthetic apatite composition is a calcium phosphate which is at least slightly soluble in water. Water solubility is necessary to give mobility to nutrient elements contained in the apatite matrix.

Preferably, from about 30 to about 50 parts phosphorus are used per 100 parts calcium, by weight, and more preferably, from about 40 to about 45 parts phosphorus per 100 parts calcium.

One or more essential agronomic nutrients besides calcium and phosphorus are dispersed within the crystal structure of the synthetic apatite. Essential agronomic nutrients (agronutrients) in addition to calcium and phosphorus, include potassium, nitrogen, magnesium, sulfur, zinc, chlorine, iron, manganese, copper, molybdenum and boron. The latter seven elements (zinc, chlorine, iron, manganese, copper, molybdenum and boron) are generally referred to as micronutrients and are needed by plants in lower amounts than the other essential agronutrients.

Agronutrients are provided in the present composition as water soluble inorganic (ionic) compounds. The inorganic compounds should not have acute toxicity (e.g. cyanide salts), or other undesirable properties and should be free of excessive amounts of agrotoxins including unwanted elements and organic toxins. Undesirable elements typically include most heavy metals such as lead, cadmium, mercury, and the like, and other elements such as fluorine, sodium, arsenic, antimony, selenium, tin, and the like. The synthetic apatite can, however, contain a relatively small amount of any of these toxins below a toxic level for plants and, where appropriate, grazing animals. For example, natural apatite contains about 6 percent fluorine and has only limited potential as a soil supplement because of the fluorine toxicity, particularly to grazing animals such as sheep which can ingest the fluorine, e.g. by licking the soil containing the supplement. Prior art phosphatic fertilizers, in contrast, can contain about 3000 ppm fluorine, whereas natural soils average about 300 ppm and plants typically contain about 3 ppm fluorine. Thus, the present synthetic apatite composition should generally contain no more than 10 parts fluorine per 100 parts calcium, by weight, but preferably contains no more than 3000 ppm fluorine, more preferably no more than 300 ppm, and especially no more than 3 ppm. Tolerance levels of specific plants and animals for other agrotoxins can be found in the literature or determined empirically. The amount of agrotoxins in the synthetic apatite should be less than an amount which would result in release into the environment of the agrotoxins in excess of a given tolerance level.

Examples of suitable water soluble compounds of agronutrients used in the preparation of the synthetic apatite include potassium compounds such as potassium chloride, potassium nitrate, potassium nitrite, potassium sulfate, and potassium phosphate; magnesium compounds such as magnesium nitrate, magnesium chloride, magnesium nitrite, magnesium chlorate, magnesium perchlorate and hydrates thereof; sulfur compounds such as sodium sulfate, ammonium sulfate, potassium sulfate, and hydrates thereof; zinc compounds such as zinc chloride, zinc nitrate, zinc nitrite, zinc sulfate and hydrates thereof; chlorine compounds such as sodium chloride, potassium chloride, ammonium chloride; iron compounds such as ferric nitrate, ferrous nitrate, ferrous nitrite, ferric nitrite, ferric chloride, ferrous chloride, ferric sulfate, ferrous sulfate and hydrates thereof; manganese compounds such as manganese(II) nitrate, manganese(II) nitrite, manganese dichloride, manganese(II) sulfate and hydrates thereof; copper compounds such as copper(II) chloride, copper(III) chloride, copper(II) nitrate, copper(II) nitrite and hydrates thereof; molybdenum compounds such as ammonium paramolybdate, ammonium permolybdate, sodium trimolybdate, sodium tetramolybdate, sodium paramolybdate, sodium octamolybdate, potassium molybdate and hydrates thereof; and boron compounds such as sodium tetraborate, sodium metaborate, potassium tetraborate, potassium metaborate, ammonium tetraborate, hydrates thereof and orthoboric acid. The preferred, more preferred and optimum amounts of the agronomic nutrient elements per 100 parts calcium in the synthetic apatite, are set forth in Table 1.

TABLE 1

| Agronutrient Element | Preferred Amount (parts by Weight) | More Preferred Amount (parts by weight) | Optimum Amount (parts by weight) |
|---|---|---|---|
| Ca | 100 | 100 | 100 |
| P | 30–50 | 40–45 | 40–42 |
| K | 0–4 | 1–4 | 2–3 |
| Mg | 0–5 | 2–5 | 3–4 |
| S | 0–4 | 2–4 | 2.5–3.5 |
| Zn | 0–0.4 | 0.2–0.4 | 0.08–0.3 |
| Cl | 0–1.25 | 0.5–1.25 | 1.0–1.13 |
| Fe | 0–4 | 1–4 | 2–3 |
| Mn | 0–1.2 | 0.5–1.2 | 0.5–1 |
| Cu | 0–0.12 | 0.05–0.12 | 0.08–0.1 |
| Mo | 0–0.0025 | 0.001–0.002 | 0.001–0.0015 |
| B | 0–0.05 | 0.01–0.04 | 0.02–0.03 |

The synthetic apatite composition can also comprise a silicon and/or carbonate solubility control agent dispersed in the apatite matrix. The solubility control agent increases or decreases the water solubility and permits enhanced control over the rate at which nutrient elements are released.

The solubility control agent is provided in the synthetic apatite composition as a water soluble inorganic or organic compound. Examples of suitable water soluble carbonate compounds include sodium carbonate, sodium bicarbonate, ammonium carbonate, ammonium bicarbonate, potassium carbonate and potassium bicarbonate. Examples of water soluble silicon compounds include inorganic silicates such as sodium silicate, sodium disilicate, sodium metasilicate, sodium orthosilicate, potassium disilicate, potassium metasilicate, potassium hydrogen disilicate, ammonium silicate, and hydrates thereof, and organic silicates such as ethyl orthosilicate and propyl orthosilicate.

A solubility control agent can comprise from 0 to about 15 parts by weight per 100 parts calcium. A carbonate agent is preferably used in an amount of 0 to about 15 parts by weight per 100 parts calcium, more preferably from about 2 to about 10 parts by weight and optimally from about 4 to about 6 parts by weight. A silicon agent is preferably used in an amount of 0 to about 10 parts by weight per 100 parts calcium, more preferably from about 2 to about 6 parts by weight and optimally from about 3 to about 5 parts by weight.

The present synthetic apatite composition can optionally include a binder agent to facilitate processing of the calcium phosphate into pellet form. Examples of such processing aid binders include calcium-lignosulfonate, cellulose, and the like. The binder comprises from 0 to about 10 percent by weight or more of the synthetic apatite.

The present synthetic apatite composition is the precipitated product of a water soluble calcium compound and a water soluble phosphate mixture comprising a water soluble phosphate compound and one or more water soluble agronutrients. The resulting product has nutrient elements incorporated into the structure of the calcium phosphate matrix.

The apatite is conveniently made, for example, by preparing two or more aqueous stock solutions containing the appropriate compounds and mixing the stock solutions together. An inorganic replacement reaction occurs in the solution mixture to produce a precipitate. The precipitate can be recovered, e.g. by filtration, and dried.

A first stock solution is made by dissolving a suitable quantity of the water soluble calcium compound in a neutral or basic aqueous medium. Examples of suitable calcium compounds include calcium nitrate, calcium nitrite, calcium chloride, calcium chlorate, hydrates thereof, and the like. Calcium nitrate tetrahydrate is a preferred compound. The first solution preferably includes the calcium compound in an amount of from about 1.0 to about 1.6 moles per liter.

A second stock solution is prepared by dissolving a suitable quantity of the soluble phosphate compound and suitable quantities of the soluble anionic nutrient compound(s) in a neutral or basic aqueous medium. Examples of suitable soluble phosphate compounds include ammonium orthophosphate-mono, ammonium orthophosphated; ammonium orthophosphate, ammonium hypophosphate and the like. The second solution preferably includes the phosphate compound in an amount of from about 0.5 to about 0.8 moles per liter. The amount of anionic nutrient compound(s) in the second solution will depend on the desired concentration in the synthetic apatite end product which, in turn, will depend on the agronomic application. Generally, the second stock solution can include one or more anionic nutrient compounds each in an amount of from about 0.002 to about 0.4 moles per liter.

A third stock solution is prepared, where appropriate, by dissolving a suitable quantity of the soluble cationic nutrient compound(s) in a neutral or basic aqueous medium. The quantity of the cationic nutrient compound(s) in the third solution will again depend on the desired concentration in the synthetic apatite end product which, in turn, will depend on the agronomic application. Generally, the third solution includes one or more cationic nutrient compounds, each in an amount of from about 0.05 to about 5 moles per liter.

The optional silicon and/or carbonate solubility control agent can be added to the second (anionic) stock solution in an amount of from about 0.002 to about 0.4 moles per liter.

When preparing the above stock solutions, it is desirable to avoid mixing salts together which can undergo unwanted inorganic replacement reactions in the stock solutions. Therefore, ionic compounds having a desired component element in the anion are held in solution separately from ionic compounds having a desired component element in the cation. Liquid organic compounds (e.g. ethyl orthosilicate), however, can be added to any of the stock solutions or added separately before or after the stock solutions are mixed together.

A preferred basic aqueous medium comprises a solution of from about 18 to about 30 percent by weight of ammonium hydroxide in deionized water. A preferred neutral aqueous medium comprises deionized water.

Typically, the third stock solution is mixed with the second stock solution and the combined solution is then mixed with the first stock solution. The resulting mixture is then maintained at ordinary temperature and pressure for a sufficient time period for the crystalline precipitate to form.

The precipitate is recovered by ordinary means, such as, for example, by decanting the supernatant and filtering in a Bchner funnel. The precipitate is preferably washed with deionized water.

The washed precipitate can be dried at room temperature. Preferably, however the precipitate is dried at a temperature ranging from about 200° C. to about 600° C. for a time period of from about 2 to about 20 hours in drying equipment such as an oven, wherein the temperature is preferably boosted in steps of 200° C. after 2 hour intervals. The drying procedure can simultaneously dry the precipitate and dehydrate or partially dehydrate the calcium phosphate endproduct. Solubility is also partially dependent on the degree of hydration of the calcium phosphate crystals, i.e. crystal size and degree of crystallinity. Since solubility is reduced by dehydration, the drying procedure specified can be used to adjust the solubility of the final product. The actual drying procedure used is not particularly critical so long as care is exercised in obtaining the desired degree of dehydration. The dried precipitate is preferably cooled in a low humidity environment.

The precipitate can be crushed, granulated or pelletized by conventional means to produce a suitable particle size for use in soil treatment. Binding agents can be used to assist the formation of a relatively consistent granulation particle size and avoid the production of fines. Preferably, non-reactive binders are used.

As indicated above, the type of nutrient elements incorporated into the calcium phosphate crystal structure can vary from a single nutrient element to all seven micronutrients as well as potassium, sulfur and magnesium. The quantity of each nutrient element incorporated can be specified based on the agronomic factors involved.

When the instant synthetic apatites come in contact with moisture, the dispersed nutrients (in addition to the calcium and phosphorus) are slowly released as dissolution occurs. However, several factors affect the degree of solubility and hence can be used to control the rate of nutrient release. Mentioned above are the solubility control agents and the drying treatment. Other known factors include soil acidity, size of the apatite crystals, and the presence of calcium or phosphate sinks in the system, e.g., an exchange material. Desired solubility is usually determined empirically based on soil properties, climate, rainfall, type of plant being grown, growth cycle requirements, and the like agronomic factors. The effect of carbonate content on natural apatites is described in several publications including Caro, J., *Journal of Agricultural Food Chemistry*, 4:684–687, 1956; McClellan, G., *American Mineralogist*, 54:1374–1391, 1969; and Lehr R., *National Fertilizer Development Center Bulletin*, Y-43, Vol. 8 published by the Tennessee Valley Authority, Muscle Shoals, Alabama which are hereby incorporated herein by reference.

The present invention is further illustrated by the following examples:

Examples 1-3

Three synthetic apatite compositions having nutrient elements incorporated into the crystalline structure were synthesized by an inorganic replacement reaction to simulate a naturally occurring hydroxyapatite mineral. Initially, three stock solutions (A, B and C) were prepared using laboratory reagent grade chemicals. Each reaction was run using 500 ml of stock solutions A and B and 20 ml of stock solution C. The composition of the solutions is shown in Table 2.

TABLE 2

| Compound | Concentration (grams) | | |
|---|---|---|---|
| | Example 1 | Example 2 | Example 3 |
| Solution A (0.5 liters 20 wt % $NH_4OH$ in deionized water) | | | |
| Calcium nitrate tetrahydrate $(Ca(NO_3)_2.4H_2O)$ | 141.52 | 141.52 | 141.52 |
| Solution B (0.5 liters 20 wt % $NH_4OH$ in deionized water) | | | |
| Ammonium orthophosphate-mono $((NH_4)_2HPO_4)$ | 43.32 | 43.32 | 43.32 |
| Ammonium carbonate $((NH_4)CO_3)$ | 11.93 | 11.93 | — |
| Ammonium chloride $((NH_4)Cl)$ | 1.011 | 1.011 | 1.011 |
| Orthoboric acid $(H_3BO_4)$ | 0.779 | 0.779 | 0.779 |
| Ammonium paramolybdate $((NH_4)_6Mo_7O_{24}.4H_2O)$ | 0.00098 | 0.00098 | 0.00098 |
| Ammonium sulfate $((NH_4)_2SO_4)$ | 2.4974 | 2.4974 | 2.4974 |
| Solution C (20 ml deionized water) | | | |
| Magnesium nitrate $(Mg(NO_3)_2)$ | 13.499 | 3.374 | 12.972 |
| Iron(II) nitrate hexahydrate $(Fe(NO_3)_2.6H_2O)$ | 3.627 | 3.627 | 3.627 |
| Manganese(II) sulfate monohydrate $(MnSO_4.H_2O)$ | 0.5408 | 0.5408 | 0.5408 |
| Zinc nitrate $(Zn(NO_3)_2)$ | 0.5652 | 0.5652 | 0.5652 |
| Copper(II) nitrate 2.5 hydrate $(CU(NO_3)_2.2.5H_2O)$ | 0.1464 | 0.1464 | 0.1464 |
| Other additive (ml) | | | |
| Ethyl orthosilicate | — | 5 | — |

After stock solutions A, B and C were prepared, solution C was quickly added to solution B and vigorously mixed for several seconds. This combined solution (B and C) was then added to solution A. In Example 2, the ethyl orthosilicate liquid was also added to solution A concurrently with solutions B and C. In all the examples the final mixture was vigorously stirred for 5 minutes and then allowed to stand for 18 hours to precipitate the calcium phosphate product. The clear supernatant was decanted and disposed of. The precipitate was washed 4 times with 3 liters of deionized water each washing. The precipitate was filtered using a Büchner funnel and Whatman #41 filter paper, and washed again with an additional 500 ml of deionized water. The precipitate was removed from the filter paper and placed into a glass beaker for drying. The precipitate was dried in an oven at 200° C. for 17 hours, lightly crushed in an agate mortar and stored in a desiccator.

Figure 1:
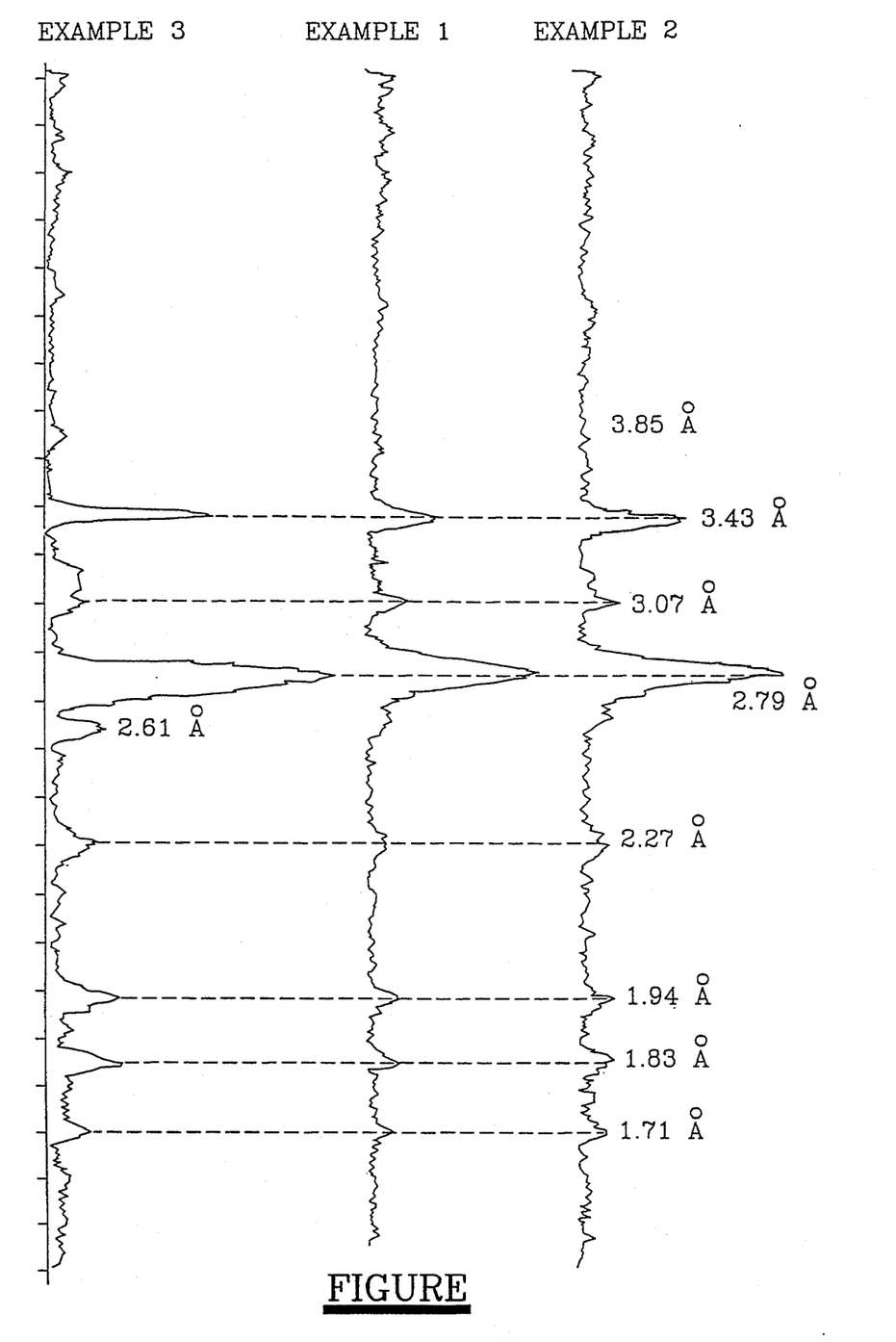
The Figure shows diffractographs with peak spacing for three different synthetic apatite compositions of the present invention. The diffractographs indicate that the present synthetic apatite has a crystalline structure similar to naturally occurring hydroxyapatite and carbonate hydroxyapatite.

The three synthetic materials were characterized by powder x-ray diffraction and by electron microprobe analysis. The Figure shows diffractographs of the compositions. The peaks (d-spacing) correspond to peaks for natural hydroxyapatites. Peak width was narrow suggesting that individual crystals have a width of from about 200-500 angstroms. The chemical analysis of the composition is shown in Table 3.

TABLE 3

| | Fraction | | |
|---|---|---|---|
| Component | Example 1 | Example 2 | Example 3 |
| $Na_2O$ | 0 | 0 | 0 |
| $K_2O$ | 0 | 0 | 0 |
| $SO_3$ | 0.439 | 0.139 | 2.584 |
| $CaO$ | 46.165 | 47.789 | 45.211 |
| $P_2O_5$ | 33.461 | 35.205 | 36.116 |
| $Fe_2O_3$ | 1.001 | 1.217 | 1.175 |
| $MgO$ | 2.839 | 0.700 | 2.562 |
| $SiO_2$ | — | 0.9838 | — |
| $OH$ | 3.163 | 3.265 | 3.401 |
| $CO_3$ | 6.7 | 5.7 | — |
| Mn | 2028 ppm | 2468 ppm | 2635 ppm |
| Cu | 38 ppm | 75 ppm | 79 ppm |
| Cl | 350 ppm | 140 | 100 |
| Zn | 303 ppm | 849 ppm | 587 |
| $MoO_3$ | 4 ppm | 53 ppm | 0 |
| $BO_3$ | 1237 | 768 | 1716 |

Examples 4-12

In the following examples, the apatite compositions prepared in Examples 1-3 were contacted with deionized water to determine the equilibrium ion concentration after dissolution. At the end of each run, pH and the ion concentrations of the various elements were measured. Concentrations of manganese, iron, copper and zinc ions were determined using DTPA chelating agent (pH=7.3). The procedure consisted of placing a 0.5 g sample of the synthetic apatite composition in a covered glass bottle containing 80 ml of deionized water. The bottles and samples were placed in an environmentally controlled reciprocal shaker at a setting of 100 rpm and shaken for 96 hours. The temperature was held at 25° C. Results are given in Table 4.

TABLE 4

| Ex. No. | Sample | pH | Element Concentration | | | | | | | | | | |
|---|---|---|---|---|---|---|---|---|---|---|---|---|---|
| | | | mg/l | | | | mg/kg | | | | mg/l | | |
| | | | P | Ca | Mg | S | Mn* | Fe* | Cu* | Zn* | B | Mo | Cl |
| 4 | 1 | 8.70 | 1.33 | 13.6 | 29.8 | 5.6 | 121 | 244 | 6 | 31 | 4.4 | <0.02 | 0.6 |
| 5 | 1 | 8.70 | 1.30 | 13.6 | 38.8 | 6.0 | 118 | 249 | 6 | 29 | 4.4 | <0.02 | 1.7 |
| 6 | 1 | 8.70 | 1.30 | 13.5 | 39.6 | 5.8 | 118 | 250 | 6 | 29 | 4.3 | <0.02 | 1.1 |
| 7 | 2 | 8.13 | 0.17 | 15.2 | 3.68 | 2.4 | 152 | 250 | 7 | 56 | 1.9 | 0.02 | 2.3 |
| 8 | 2 | 8.16 | 0.22 | 14.8 | 3.27 | 2.7 | 163 | 302 | 7 | 59 | 1.9 | <0.02 | 1.6 |
| 9 | 2 | 8.16 | 0.17 | 14.1 | 3.22 | 2.3 | 152 | 246 | 7 | 56 | 1.9 | <0.02 | 3.1 |
| 10 | 3 | 7.00 | 2.95 | 10.3 | 2.67 | 17.8 | 160 | 402 | 10 | 57 | 0.8 | <0.02 | 0.4 |
| 11 | 3 | 6.95 | 3.80 | 10.3 | 2.75 | 17.6 | 158 | 406 | 10 | 55 | 0.8 | <0.02 | 0.4 |

TABLE 4-continued

| Ex. No. | Sample | pH | mg/l | | | | mg/kg | | | | mg/l | | |
|---|---|---|---|---|---|---|---|---|---|---|---|---|---|
| | | | P | Ca | Mg | S | Mn* | Fe* | Cu* | Zn* | B | Mo | Cl |
| 12 | 3 | 7.12 | 3.45 | 10.0 | 2.71 | 17.6 | 158 | 408 | 10 | 55 | 0.8 | <0.02 | 0.5 |

DTPA extractable, pH = 7.3.

Examples 13-39

In the following examples, the apatite compositions prepared in Examples 1-3 were contacted with an aqueous medium wherein the pH was varied between 5 and 7 to determine the equilibrium calcium and magnesium concentration as an indication of solubility versus pH. The procedure was similar to Examples 4-12 except that 0.5M sodium acetate solutions buffered with acetic acid to the desired pH were used instead of deionized water. Results are given in Table 5. As expected, the synthetic apatite dissolved to a greater extent in a more acidic medium.

TABLE 5

| Ex. No. | Sample | pH | Element Concentration (mg/l) | |
|---|---|---|---|---|
| | | | Ca | Mg |
| 13 | 1 | 8.00 | 116.1 | 51.8 |
| 14 | 1 | 8.06 | 99.8 | 48.0 |
| 15 | 1 | 8.11 | 98.5 | 46.6 |
| 16 | 1 | 6.30 | 314.7 | 70.0 |
| 17 | 1 | 6.31 | 310.5 | 66.0 |
| 18 | 1 | 6.31 | 310.5 | 66.0 |
| 19 | 1 | 5.08 | 1216 | 82.8 |
| 20 | 1 | 5.08 | 1384 | 82.6 |
| 21 | 1 | 5.08 | 1244 | 84.6 |
| 22 | 2 | 7.91 | 74.0 | 9.2 |
| 23 | 2 | 7.92 | 73.7 | 9.0 |
| 24 | 2 | 7.92 | 73.4 | 9.1 |
| 25 | 2 | 6.25 | 287.0 | 15.7 |
| 26 | 2 | 6.25 | 282.8 | 15.4 |
| 27 | 2 | 6.25 | 287.0 | 15.8 |
| 28 | 2 | 5.07 | 1098 | 20.7 |
| 29 | 2 | 5.07 | 1056 | 20.5 |
| 30 | 2 | 5.07 | 1098 | 20.6 |
| 31 | 3 | 7.56 | 37.2 | 36.3 |
| 32 | 3 | 7.56 | 38.5 | 35.6 |
| 33 | 3 | 7.55 | 37.9 | 37.9 |
| 34 | 3 | 6.15 | 189.5 | 53.8 |
| 35 | 3 | 6.15 | 187.9 | 54.0 |
| 36 | 3 | 6.15 | 191.1 | 54.2 |
| 37 | 3 | 5.05 | 988 | 77.4 |
| 38 | 3 | 5.05 | 975 | 74.0 |
| 39 | 3 | 5.05 | 975 | 74.6 |

The foregoing description of the composition and method is illustrative and explanatory thereof. Various changes in the materials, apparatus, and particular components and steps employed will occur to those skilled in the art. It is intended that all such variations within the scope and spirit of the appended claims be embraced thereby.

What is claimed is:

1. A method for preparing a slow-release synthetic apatite fertilizer, comprising the steps of:
   (1) preparing an aqueous calcium solution from a soluble ionic calcium compound;
   (2) preparing an aqueous phosphate solution from a soluble ionic phosphate compound, optionally with an anionic agronutrient selected from sulfate, chloride, molybdate, borate, and combinations thereof, from a soluble ionic compound containing the anionic agronutrient;
   (3) optionally preparing an aqueous solution of cationic agronutrients selected from potassium, magnesium, zinc, iron, manganese, copper, and combinations thereof, from a soluble ionic compound containing the cationic agronutrient;
   (4) mixing together the calcium solution, the phosphate solution and the cationic agronutrient solution, if prepared, and forming an apatite precipitate by inorganic replacement reaction; and
   (5) recovering the precipitate with a crystalline hydroxylapatite structure having at least one agronutrient structurally dispersed therein selected from sulfate, borate, molybdate, potassium, magnesium, zinc, iron, manganese, copper, or a combination thereof.

2. The method of claim 1, wherein the cationic agronutrient solution is prepared, and wherein the mixing step comprises sequentially mixing the phosphate solution with the cationic agronutrient solution and then mixing the resulting phosphate-agronutrient solution with the calcium solution.

3. The method of claim 1, wherein the cationic agronutrient solution, is prepared, the calcium solution comprises from about 1.0 to about 1.6 moles per liter calcium, the phosphate solution comprises from about 0.5 to about 0.8 moles per liter phosphate and from about 0.002 to about 0.4 moles per liter of sulfate, molybdate, borate, or a combination thereof, and the cationic agronutrient solution comprises from about 0.05 to about 5 moles per liter of potassium, magnesium, zinc, iron, manganese, copper, or a combination thereof.

4. The method of claim 1, wherein the cationic agronutrient solution is prepared, the calcium solution comprises 1.0-1.6 molar calcium, the phosphate solution comprises 0.5-0.8 molar phosphate and 0.002-0.4 molar sulfate, molybdate, chloride and borate, and the cationic agronutrient solution comprises 0.05-5 molar potassium, magnesium, zinc, iron, manganese and copper.

5. The method of claim 1, wherein the mixing step comprises mixing the solutions together with a solution of at least one water soluble solubility control agent selected from silicon and carbonate compounds.

6. The method of claim 5, wherein the carbonate compound is selected from sodium carbonate, sodium bicarbonate, ammonium carbonate, ammonium bicarbonate, potassium carbonate and potassium bicarbonate; or the silicon compound is selected from sodium silicate, sodium disilicate, sodium metasilicate, sodium orthosilicate, potassium disilicate, potassium metasilicate, potassium hydrogen disilicate, ammonium silicate, hydrates thereof and ethyl orthosilicate.

7. A slow-release fertilizer, comprising:
   one or more agronutrients structurally dispersed in a crystalline matrix of hydroxylapatite essentially free of agrotoxins and prepared by the method of claim 1.

8. The fertilizer of claim 7, comprising from about 30 to about 50 parts phosphorus per 100 parts calcium by weight; potassium up to about 4 parts per 100 parts calcium by weight; magnesium up to about 5 parts per 100 parts calcium by weight; sulfur up to about 4 parts per 100 parts calcium by weight; zinc up to about 0.4 parts per 100 parts calcium by weight; chlorine up to about 1.25 parts per 100 parts calcium by weight; iron up to about 4 parts per 100 parts calcium by weight; manganese up to about 1.2 parts per 100 parts calcium by weight; copper up to about 0.12 parts per 100 parts calcium by weight; molybdenum up to about 0.0025 parts per 100 parts calcium by weight; and boron up to about 0.05 parts per 100 parts calcium by weight.

9. The fertilizer of claim 8, comprising not more than 3000 ppm fluorine.

10. The fertilizer of claim 7, further comprising a silicon and/or carbonate solubility control agent.

11. The fertilizer of claim 10, comprising from about 2 to about 10 parts silicon agent per 100 parts calcium.

12. The fertilizer of claim 10, comprising from about 2 to about 15 parts carbonate agent per 100 parts calcium.

13. The fertilizer of claim 7, comprising not more than 10 parts calcium by weight.

14. The fertilizer of claim 1, comprising per 100 parts calcium by weight:
40–45 parts phosphorous;
1–4 parts potassium;
2–5 parts magnesium;
2–4 parts sulfur;
0.2–0.4 parts zinc;
0.5–1.25 parts chlorine;
1–4 parts iron;
0.5–1.2 parts manganese;
0.05–0.12 parts copper;
0.001–0.002 parts molybdenum; and
0.01–0.04 parts boron.

15. The fertilizer of claim 7, comprising per 100 parts calcium by weight:
40–42 parts phosphorous;
2–3 parts potassium;
3–4 parts magnesium;
2.5–3.5 parts sulfur;
0.08–0.3 parts zinc;
1.0–1.13 parts chlorine;
2–3 parts iron;
0.5–1 parts manganese;
0.08–0.1 parts copper;
0.001–0.0015 parts molybdenum; and
0.02–0.03 parts boron.

16. The method of claim 1, comprising dehydrating the precipitate at a temperature from about 200° C. to about 600° C. to control the solubility of the synthetic apatite.

17. An agronutrient-substituted hydroxylapatite of generally uniform composition having the formula:

$$(Ca_{5-xm/2}M_x)((PO_4)_{3-yq/3}Q_y)((OH)_{1-z}X_z)$$

wherein M is a cation containing an element selected from potassium, zinc, iron, manganese, magnesium, or copper, or a combination thereof;
wherein m is the molar average valence of M according to the equation $m=(\Sigma m_i x_i)/(\Sigma x_i)$ where each $m_i$ is the valence of an ith cation comprising M and $x_i$ is the relative molar proportion of the ith cation;
wherein Q is an anion of carbonate, silicate or containing an element selected from boron, molybdenum, or sulfur, or a combination thereof;

wherein q is the molar average valence of Q according to the equation $q=(\Sigma q_i y_i)/(\Sigma y_i)$ where each $q_i$ is the valence of an ith anion comprising Q and $y_i$ is the relative molar proportion of the ith anion;
wherein X is chloride, fluoride or a combination thereof; and
wherein x has a value of 0–0.82, y has a value of 0–0.76, and z has a value of 0–0.15, provided that at least one of x and y are greater than zero and the amount of fluoride does not exceed 3000 ppm by weight, and when x is zero Q includes an anion of boron, molybdenum, or sulfur, or a combination thereof.

18. A method for supplying nutrient elements in an agronomical process, comprising the steps of:
placing a fertilizing amount of the hydroxylapatite composition of claim 17 adjacent a plant root system; and
contacting the hydroxylapatite with moisture to release the agronutrient.

19. A hydroponics fertilizing method comprising the steps of:
circulating a hydroponics solution through a bed of the hydroxylapatite composition of claim 17 to replenish the concentration of agronutrients in the hydroponics solution.

20. The hydroxylapatite of claim 17, herein $M_x$ has the formula:

$$K_{xK}Mg_{xMg}Fe_{xFe}Zn_{xZn}Mn_{xMn}Cu_{xCu}$$

wherein:
$x_K \leq 0.205$;
$x_{Mg} \leq 0.412$;
$x_{Fe} \leq 0.144$;
$x_{Zn} \leq 0.0123$;
$x_{Mn} \leq 0.044$;
$x_{Cu} \leq 0.0038$;
$x = x_K + x_{Mg} + x_{Fe} + x_{Zn} + x_{Mn} + x_{Cu}$; and
$x > 0$.

21. The hydroxylapatite of claim 20, wherein:
$0.051 \leq x_K \leq 0.205$;
$0.165 \leq x_{Mg} \leq 0.412$;
$0.0359 \leq x_{Fe} \leq 0.144$;
$0.006 \leq x_{Zn} \leq 0.0123$;
$0.018 \leq x_{Mn} \leq 0.044$; and
$0.0016 \leq x_{Cu} \leq 0.0038$.

22. The hydroxylapatite of claim 20, wherein:
$0.102 \leq x_K \leq 0.154$;
$0.247 \leq x_{Mg} \leq 0.33$;
$0.072 \leq x_{Fe} \leq 0.108$;
$0.0061 \leq x_{Zn} \leq 0.0092$;
$0.018 \leq x_{Mn} 0.036$; and
$0.0025 \leq x_{Cu} \leq 0.0032$.

23. The hydroxylapatite of claim 17, wherein $Q_y$ has the formula:

$$(CO_3)_{yC}(SiO_4)_{ySi}(MoO_4)_{yMo}(BO_3)_{yB}(SO_4)_{yS}$$

wherein $y_C$ has a value up to about 0.5, $y_{Si}$ has a value up to about 0.218, $y_{Mo}$ has a value up to about 0.000052, $y_B$ has a value up to about 0.0093, and $y_S$ has a value up to about 0.25; and
wherein $y = y_C + y_{Si} + y_{Mo} + y_B + y_S$, and $(y_{Mo} + y_B + y_S) > 0$.

24. The hydroxylapatite of claim 23, wherein:
$0.00002 \leq y_{Mo} \leq 0.000042$;
$0.00185 \leq y_B \leq 0.00741$; and $0.125 \leq y_S \leq 0.25$.

25. The hydroxylapatite of claim 24, wherein:
$0.0668 \leq y_C \leq 0.334$; or
$0.0435 \leq y_{Si} \leq 0.131$.

26. The hydroxylapatite of claim 23, wherein:
$0.000021 \leq y_{Mo} \leq 0.0000313$;
$0.0037 \leq y_B \leq 0.0056$; and
$0.156 \leq y_S \leq 0.219$.

27. The hydroxylapatite of claim 26, wherein:
$0.134 \leq y_C \leq 0.2$; or
$0.0653 \leq y_{Si} \leq 0.109$.

28. The hydroxylapatite of claim 17, wherein $X_z$ has the formula:

$$Cl_{zCl}F_{zF}$$

wherein $z_{Cl}$ has a value up to about 0.071, $z_F$ has a value less than about 0.08, and $z = z_{Cl} + z_F$.

29. The hydroxylapatite of claim 28, wherein:
$0.0283 \leq z_{Cl} \leq 0.071$; and
$z_F \leq 0.008$.

30. The hydroxylapatite of claim 28, wherein:
$0.0565 \leq z_{Cl} \leq 0.064$; and
$z_F \leq 0.00008$.

31. An agronutrient-substituted hydroxylapatite of the formula:

$$[Ca_{5-xm/2}K_xK Mg_{xMg}Fe_{xFe}Zn_{xZn}Mn_{xMn}Cu_{xCu}][(PO_4)_{3-yq/3}(CO_3)_{yC}(SiO_4)_{ySi}((MoO_4)_{yMo}(BO_3)_{yB}(SO_4)_{yS}][(OH)_{1-z}Cl_{zCl}F_{zF}]$$

wherein m is the molar average valence of the potassium, magnesium, iron, zinc, manganese and copper cations according to the equation:

$$m = (x_K + 2x_{Mg} + 2x_{Fe} + 2x_{Zn} + 2x_{Mn} + 2x_{Cu})/x$$

wherein $Q_S$ is an anion of sulfur and q is the molar average valence of the anions $CO_3$, $SiO_4$, $MoO_4$, $BO_3$ and $SO_4$ according to the equation:

$$q = (2y_C + 4y_{Si} + 2y_{Mo} + 3y_B + 2y_S)/y$$

wherein $x = x_K + x_{Mg} + x_{Fe} + x_{Zn} + x_{Mn} + x_{Cu}$, $y = y_C + y_{Si} + y_{Mo} + y_B + y_S$, $z = z_{Cl} + z_F$, and at least one of x, $y_{Mo}$, $y_B$ and $y_S$ is greater than zero; and wherein:
$x_K \leq 0.21$;
$x_{Mg} \leq 0.41$;
$x_{Fe} \leq 0.14$;
$x_{Zn} \leq 0.012$;
$x_{Mn} \leq 0.044$;
$x_{Cu} \leq 0.0038$;
$y_C \leq 0.5$;
$y_{Si} \leq 0.218$;
$y_{Mo} \leq 0.000052$;
$y_B \leq 0.0093$;
$y_S \leq 0.25$;
$z_{Cl} \leq 0.071$; and
$z_F \leq 0.08$.

32. The hydroxylapatite of claim 31, wherein:
$0.051 \leq x_K \leq 0.205$;
$0.165 \leq x_{Mg} \leq 0.412$;
$0.0359 \leq x_{Fe} \leq 0.144$;
$0.006 \leq x_{Zn} \leq 0.0123$;
$0.018 \leq x_{Mn} \leq 0.044$;
$0.0016 \leq x_{Cu} \leq 0.0038$;
$0.00002 \leq y_{Mo} \leq 0.000042$;
$0.00185 \leq y_B \leq 0.00741$;
$0.125 \leq y_S \leq 0.25$;
$0.0283 \leq z_{Cl} \leq 0.071$; and
$z_F \leq 0.008$.

33. The hydroxylapatite of claim 32, wherein:
$0.0668 \leq y_C \leq 0.334$; or
$0.0435 \leq y_{Si} 0.131$.

34. The hydroxylapatite of claim 31, wherein:
$0.102 \leq x_K \leq 0.154$;
$0.247 \leq x_{Mg} \leq 0.33$;
$0.072 \leq x_{Fe} \leq 0.108$;
$0.006 \leq x_{Zn} \leq 0.009$;
$0.018 \leq x_{Mn} \leq 0.036$;
$0.0025 \leq x_{Cu} \leq 0.0032$;
$0.000021 \leq y_{Mo} \leq 0.0000313$;
$0.0037 \leq y_B \leq 0.0056$;
$0.157 \leq y_S \leq 0.219$;
$0.0565 \leq z_{Cl} \leq 0.064$; and
$z_F \leq 0.00008$.

35. The hydroxylapatite of claim 34, wherein:
$0.134 \leq y_C \leq 0.2$; or
$0.0653 \leq y_{Si} \leq 0.109$.

36. The method of claim 1, wherein the calcium compound comprises calcium nitrate, calcium nitrite, calcium chloride, calcium chlorate or a hydrate thereof and the phosphate compound comprises ammonium orthophosphate-mono, ammonium orthophosphate-di, ammonium orthophosphate or ammonium hypophosphate.

37. The method of claim 1, wherein the potassium compound is selected from potassium chloride, potassium nitrate, potassium nitrite, potassium sulphate, and potassium phosphate; the magnesium compound is selected from magnesium nitrate, magnesium chloride, magnesium nitrite, magnesium chlorate, magnesium perchlorate and hydrates thereof; the sulfur compound is selected from sodium sulfate, ammonium sulfate, potassium sulfate, and hydrates thereof; the zinc compound is selected from zinc chloride, zinc nitrate, zinc nitrite, zinc sulfate and hydrates thereof; the chlorine compound is selected from sodium chloride, potassium chloride, ammonium chloride; the iron compound is selected from ferric nitrate, ferrous nitrate, ferrous nitrite, ferric nitrite, ferric chloride, ferrous chloride, ferric sulfate, ferrous sulfate and hydrates thereof; the manganese compound is selected from manganese (II) nitrite, manganese (II) nitrite, manganese dichloride, manganese (II) sulfate and hydrates thereof; the copper compound is selected from copper (II) chloride, copper (III) chloride, copper (II) nitrate, copper (II) nitrite and hydrates thereof; the molybdenum compound is selected from ammonium paramolybdate, ammonium permolybdate, sodium trimolybdate, sodium tetramolybdate, sodium paramolybdate, sodium octamolybdate, potassium molybdate and hydrates thereof; and the boron compound is selected from sodium tetraborate, sodium metaborate, potassium tetraborate, potassium metaborate, ammonium tetraborate, hydrates thereof and orthoboric acid.

* * * * *